United States Patent
Spivak

(10) Patent No.: US 11,626,734 B2
(45) Date of Patent: Apr. 11, 2023

(54) ENERGY MANAGEMENT SYSTEM FOR A RECREATIONAL VEHICLE

(71) Applicant: Paul Spivak, Euclid, OH (US)

(72) Inventor: Paul Spivak, Euclid, OH (US)

(*) Notice: Subject to any disclaimer, the term of this patent is extended or adjusted under 35 U.S.C. 154(b) by 0 days.

(21) Appl. No.: 17/568,878

(22) Filed: Jan. 5, 2022

(65) Prior Publication Data

US 2022/0131379 A1 Apr. 28, 2022

(51) Int. Cl.
*H02J 3/14* (2006.01)
*B60R 16/03* (2006.01)
*H02M 7/04* (2006.01)

(52) U.S. Cl.
CPC .............. *H02J 3/144* (2020.01); *B60R 16/03* (2013.01); *H02M 7/04* (2013.01)

(58) Field of Classification Search
CPC . H02J 3/144; H02J 1/14; B60R 16/03; H02M 7/04; Y02T 10/92
See application file for complete search history.

(56) References Cited

U.S. PATENT DOCUMENTS

| | | | |
|---|---|---|---|
| 7,373,222 B1 * | 5/2008 | Wright | H02J 3/144 700/20 |
| 8,767,379 B2 | 7/2014 | Whitaker | |
| 2014/0111006 A1 * | 4/2014 | Baldassarre | H02J 9/002 307/38 |
| 2014/0200763 A1 * | 7/2014 | Sisk | B60L 58/13 701/36 |
| 2022/0045381 A1 * | 2/2022 | Vaidya | H02J 7/0013 |

* cited by examiner

*Primary Examiner* — Lincoln D Donovan
*Assistant Examiner* — Alex W Lam
(74) *Attorney, Agent, or Firm* — Pearne & Gordon LLP

(57) ABSTRACT

An energy management system for a recreational vehicle incudes a housing; a plurality of outputs, each output having an associated electrical parameter; and a circuit assembly arranged within the housing. The circuit assembly includes a power converter configured to receive AC power and supply DC power to one or more of the outputs; a plurality of relays, each relay being associated with a corresponding output; and a controller configured to configured to perform a load shedding operation in response to a first load condition being satisfied. The first load condition requires that a total parameter is equal to or above a first predetermined load threshold, the total parameter being a total value of the associated electrical parameters of the outputs. The load shedding operation sequentially opens any closed relays according to a predetermined opening scheme until the total parameter is below the first predetermined load threshold.

19 Claims, 2 Drawing Sheets

ENERGY MANAGEMENT SYSTEM FOR A RECREATIONAL VEHICLE

FIELD OF INVENTION

The following description relates to an energy management system, and more particularly an energy management system for a recreational vehicle.

BACKGROUND OF THE INVENTION

A recreational vehicle is a trailer or motorized vehicle that includes living quarters designed for accommodation such as, for example, a kitchen, a bathroom, and one or more sleeping facilities. Common types of recreational vehicles include motorhomes, campervans, caravans (also known as travel trailers and camper trailers), fifth-wheel trailers, popup campers, and truck campers.

Multiple electrical systems are typically implemented in a recreational vehicle for managing and distributing power throughout the vehicle. For example, a recreational vehicle may include a circuit breaker panel that connects to a master power source (e.g., a generator) and distributes AC power to multiple other electrical systems such as, for example, load shedders or generator controls. However, each of these systems must be installed individually and then electrically connected to each other to form a complete energy management system. Moreover, each of these systems can include its own control system and user interface, which may or may not be compatible with other systems. Accordingly, an object of the present disclosure is to provide a single electrical system that can be installed in a recreational vehicle to manage and distribute power. Moreover, another object is to provide an energy management system with an improved load shedding operation.

BRIEF SUMMARY

In accordance with a first aspect, an energy management system for a recreational vehicle incudes a housing; a plurality of outputs, each output having an associated electrical parameter; and a circuit assembly arranged within the housing. The circuit assembly includes a power converter configured to receive AC power, covert the AC power to DC power, and supply the DC power to one or more of the outputs; a plurality of relays, each relay being associated with a corresponding output and operable between an open state and a closed state; and a controller in communication with the plurality of relays, the controller being configured to configured to perform a load shedding operation in response to a first load condition being satisfied. The first load condition requires that a total parameter is equal to or above a first predetermined load threshold, the total parameter being a total value of the associated electrical parameters of the outputs. The load shedding operation sequentially opens any closed relays of the plurality of relays according to a predetermined opening scheme until the total parameter is below the first predetermined load threshold.

BRIEF DESCRIPTION OF THE DRAWINGS

Embodiments of the invention are better understood when the following detailed description is read with reference to the accompanying drawings, in which.

DETAILED DESCRIPTION

Figure 1:
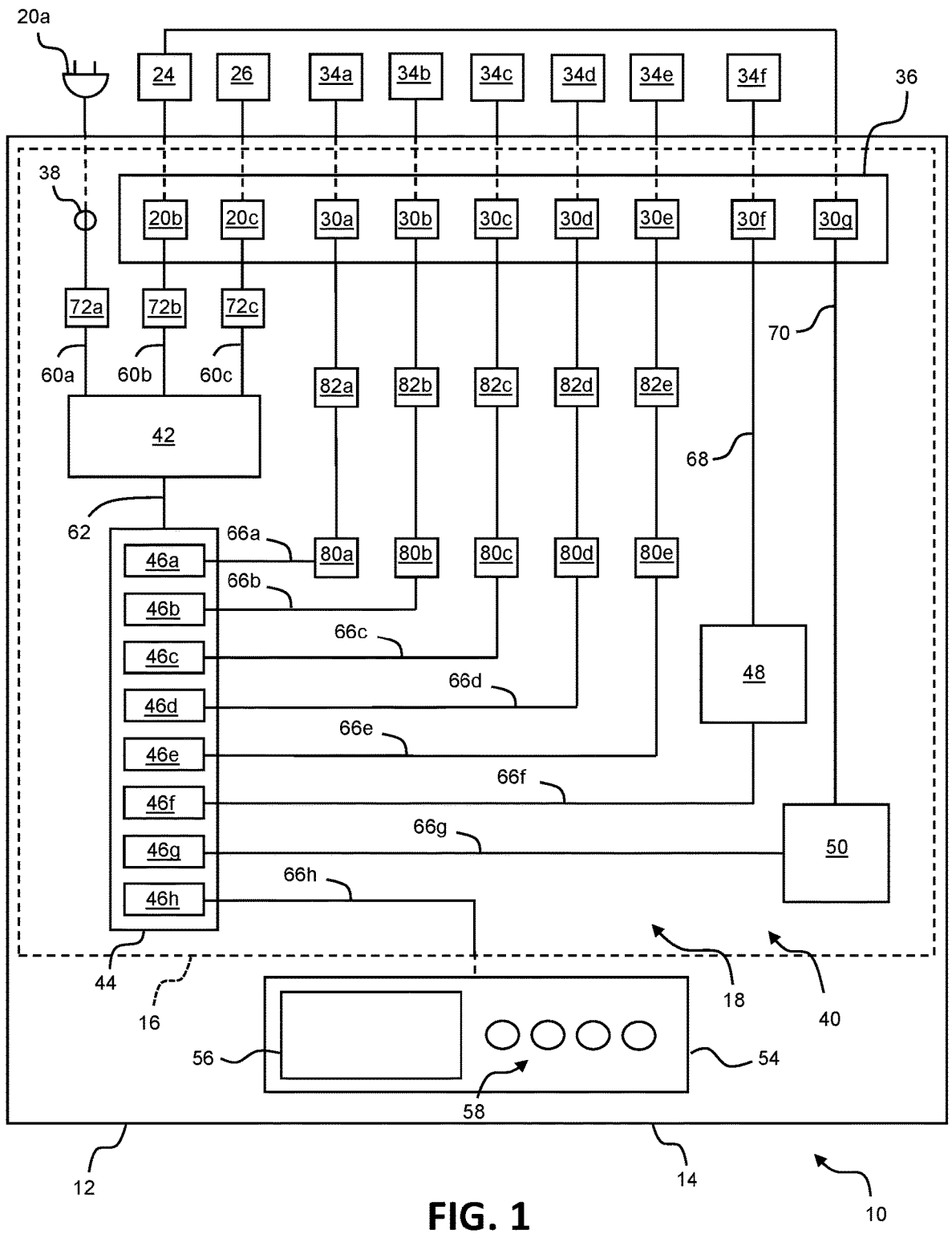
FIG. 1 is a schematic view of an example energy management system and external devices connected to the energy management system.

Turning to FIG. 1, an example energy management system 10 for a recreational vehicle includes a housing 12 that comprises a body 14 and a cover 16 (shown in broken lines) that collectively define an interior compartment 18 of the housing 12. The cover 16 is removably attached to the body 14 (e.g., via screws, latches, etc.) to permit selective access to the compartment 18.

The system 10 includes one or more inputs 20 for connecting an outside power source to the system 10 such that the source can supply power to the system 10. For example, the system 10 in the present embodiment includes a first input 20a for electrically connecting the system 10 to shore power, a second input 20b for electrically connecting the system 10 to a generator 24, and a third input 20c for electrically connecting the system 10 to a solar cell assembly 26. However, it is to be appreciated that the devices connected to the inputs 20 can vary in different embodiments.

The system 10 further includes a plurality of outputs 30 for connecting the system 10 to external devices such that the system 10 can provide outputs (e.g., power, control signals, etc.) to the devices. For example, the system 10 in the present embodiment includes a plurality of AC outputs 30a-e for connection to a plurality of AC devices 34a-e (e.g., AC wall outlets, microwave ovens, TVs, air conditioners, etc.), a DC output 30f for connection to one or more DC devices 34f (e.g., DC wall outlets, batteries, etc.), and a control output 30g for connection to the generator 24. As discussed further below, the AC outputs 30a-e and DC output 30f can provide power to their associated devices 34a-f, while the control output 30g can provide a control signal to the generator 24.

Each input 20 and output 30 can be any electrical connector (e.g., port, plug, terminal, etc.) that is coupled to (e.g., fixed to) the housing 12 and forms a connection point for an external device. For instance, the first input 20a in the present embodiment is a power cord while the remaining inputs 20b, 20c and outputs 30a-g are terminals of a terminal block 36. The power cord 20a can be configured such that its plug end is arranged outside of the housing 12 and the cord 20a extends through an aperture 38 of the housing 12 into the compartment 18. Meanwhile, the terminal block 36 and its terminals 20b, 20c, 30a-g can be fixed to the housing 12 such that one end of each terminal 20b, 20c, 30a-g is arranged and accessible within the compartment 18 (as shown in FIG. 1), while an opposite end of each terminal 20b, 20c, 30a-g is arranged on and accessible from an exterior side of the housing 12.

It is to be understood that the number, type, and arrangement of the inputs 20 and outputs 30 can vary by embodiment. Moreover, each input 20 and output 30 can be connected to multiple external devices. Still further, the external device(s) connected to each input 20 and output 30 can also vary by embodiment. Broadly speaking, the system 10 can include any configuration of one or more inputs 20 and a plurality of outputs 30 for connection to external devices without departing from the scope of the disclosure.

The system 10 further includes a circuit assembly 40 within the compartment 18 having a transfer switch 42, a breaker panel 44 with a plurality of breakers 46, an AC-DC power converter 48, and a programmable controller 50. Moreover, the system 10 includes a user interface 54 with a display 56 and one or more input devices 58 (e.g., push-buttons, toggle switches, etc.). The user interface 54 in the present embodiment is fixed to the body 14 of the housing 12 such that it is accessible on an exterior side of the housing 12. However, the user interface 54 can be fixed to the cover 16 in other embodiments, or the user interface 54 can be arranged within the compartment 18.

The circuit assembly 40 further includes a plurality of circuit lines that interconnect the above components. For example, the circuit assembly 40 includes a plurality of input lines 60 connecting the inputs 20 to the transfer switch 42, a main power line 62 connecting the transfer switch 42 to the breaker panel 44, and a plurality of AC lines 66 that connect outputs of the breakers 46 with the AC outputs 30*a-e*, the AC-DC power converter 48, the controller 50, and the user interface 54. Moreover, the circuit assembly 40 includes a DC line 68 that connects an output of the AC-DC power converter 48 with the DC output 30*f*, and a control signal line 70 that connects an output the controller 50 with the control output 30*g*. Still further, the circuit assembly 40 can include a plurality of circuit lines (not shown) that operatively connect and provide communication between the controller 50 and the transfer switch 42, AC-DC power converter 48, and user interface 54.

Each circuit line in the system 10 can be a single, continuous conductor (e.g., wire, lead, etc.) that provides an uninterrupted connection between its end components. Alternatively, each circuit line can comprise a plurality of circuit components (e.g., wires, switches, sensors, fuses, sub-circuits, etc.) that are connected together to collectively form a connection between its end components. For example, each input line 60 includes a sensor 72 and a wire that connects the sensor 72 to the transfer switch 42. The input lines 60*b*, 60*c* also include a wire that connects their sensors 72*b*, 72*c* to their associated inputs 20*b*, 20*c*, while the sensor 72*a* of the input line 60*a* is directly connected to the input 20*a*. Moreover, the AC lines 66*a-e* in the present embodiment each comprise a relay 80, a sensor 82, and a plurality of wires that are connected in series to form a connection between its associated breaker 46 and output 30. Each relay 80 and sensor 72, 82 is operatively connected to the controller 50 with a respective circuit line (not shown) that provides communication therebetween. Moreover, each relay 80 is operable between an open state and a closed state to selectively open and close its associated AC line 66*a-e*.

Broadly speaking, each circuit line of the system 10 can comprise any configuration of one or more circuit components that collectively form a connection between its end components and provide one-way or two-way communication between the end components. Moreover, said communication can be continuous or selective based on an open or closed state of the circuit line.

As noted above, the input lines 60 connect the inputs 20 to the transfer switch 42, and the main power line 62 connects the transfer switch 42 to the breaker panel 44. The transfer switch 52 can be operable to alternately connect the input lines 60 (and their associated inputs 20) to the main power line 62 and breaker panel 44. More specifically, the transfer switch 52 can be selectively operable between a first state that connects the first input line 60*a* to the main power line 62, a second state that alternately connects the second input line 60*b* to the main power line 62, and a third state that alternately connects the third input line 60*c* to the main power line 62.

The transfer switch 42 can be a manual switch with an actuator (e.g., toggle(s), push button(s), etc.) that a user can manipulate to selectively alternate the transfer switch 42 between its first, second, and third states. The actuator can be located within the compartment 18 or the actuator can penetrate the housing 12 such that it is accessible on an exterior side of the housing 12. In other examples, the transfer switch 42 can be configured to automatically switch between its first, second, and third states based on a predetermined control scheme. Such a control scheme can be programmed into an internal controller of the transfer switch 42 or can be formed by internal circuitry of the transfer switch 42. Alternatively, such a control scheme can be programmed into the controller 50 of the circuit assembly 40, which can be in operative communication with the switch 42 to control it accordingly.

Generally speaking, the transfer switch 42 can be any type of switch that is manually or automatically operable to alternately connect the inputs 20 to the breaker panel 44. Moreover, it is to be appreciated that the system 10 may exclude the transfer switch 42 in some embodiments. For instance, in embodiments of the system 10 having a single input 20 (e.g., the shore power input 20*a*), the breaker panel 44 of the circuit assembly 40 can be directly connected to that input 20 such that power supplied to the input 20 will be directly conveyed to the breaker panel 44 without passing through a transfer switch.

The circuit assembly 40 as described above can thus receive power from one of the inputs 20, transfer that power to the breaker panel 44, and in turn supply outputs (e.g., power, control signals) to any external devices 24, 34 connected to the output terminals 30. For example, the AC lines 66*a-e* can provide AC power to the devices 34*a-e* via the output terminals 30*a-e*. Moreover, the AC line 66*f* can provide AC power (e.g., 100-240V AC) to the AC-DC power converter 48, which in turn will convert the AC power to DC power (e.g., 12V or 24V) and supply that converted power to the device 34*f* via the DC line 68 and output terminal 30*f*. Furthermore, the AC line 66*g* can provide AC power to the controller 50, which (as discussed further below) can provide a control signal to the generator 24 via the control signal line 70 and terminal output 30*g*.

Moreover, the controller 50 can operate the relays 80 of the circuit assembly 40 to selectively apply power to the output terminals 30*a-e*. In particular, the controller 50 can independently close each relay 80 to close its associated AC line 66 and enable power to be delivered to its respective output terminal 30. Likewise, the controller 50 can independently open each relay 80 to open its associated AC line 66 such that power cannot be delivered to its respective output terminal 30.

In some examples, the energy supplied by an input 20 to the circuit assembly 40 may not be adequate to support the total load requirements of the external devices 34. For example, the input 20 may not be connected to an external power source, or the input 20 may be connected to an external power source that is depleted or disabled. Moreover, in some examples, the total load requirements of the external devices 34 may exceed a maximum safe load for the system 10. In such cases, one or more breakers 46 of the breaker panel 44 may open, thereby discontinuing power to their associated devices 34 and circuit components. Indeed, in some examples, a master breaker (not shown) of the breaker panel 44 can open, thereby discontinuing power to everything downstream of the breaker panel 44.

Accordingly, the system 10 can include one or features to automatically change inputs 20 and/or reduce total load on the system 10 to prevent such conditions from occurring. For example, as discussed below, the controller 50 can be configured to operate the transfer switch 42 to automatically switch connection of the main power line 62 (and breaker panel 44 connected thereto) to the input lines 60 (and their associated inputs 20) based on the adequacy of power being delivered or deliverable by the inputs 20.

More specifically, the controller 50 can be in communication with each sensor 72 of the input lines 60. Each sensor 72 can be configured to detect an electrical parameter associated with its respective input 20 and provide an output signal to the controller 50 that corresponds to the detected parameter. For the purposes of this disclosure, an electrical parameter "associated" with an input 20 refers to an electrical parameter (e.g., voltage, current, etc.) at the input 20 itself or an electrical parameter at another portion of the system 10 that corresponds to or is dependent on an electrical parameter at the input 20. In the present embodiment, each sensor 72 is a voltage sensor configured to detect a voltage along its input line 60, which will correspond to the voltage at its input 20. However, each sensor 72 may be configured to detect any other electrical parameter associated with its input 20.

As discussed above, the transfer switch 42 is operable between a first state that connects the first input line 60a to the main power line 62, a second state that alternately connects the second input line 60b to the main power line 62, and a third state that alternately connects the third input line 60c to the main power line 62. The controller 50 can be configured to continuously monitor the electrical parameters detected by the sensors 72 and automatically switch the transfer switch 42 between its first, second, and third states based on one or more of the electrical parameters and their compliance with predetermined threshold(s).

For instance, the controller 50 may be configured to initially operate the transfer switch 42 in its first state, such that the first input line 60a is connected to the main power line 62. If the voltage detected by the sensor 72a drops equal to or below a first predetermined threshold $t_1$, the controller 50 can be configured to automatically switch the transfer switch 42 from the first state to its second state, such that the second input line 60b is connected to the main power line 62. In this second state, if the voltage detected by the sensor 72b drops equal to or below a second predetermined threshold $t_2$, the controller 50 can be configured to automatically switch the transfer switch 42 from the second state to the third state, such that the third input line 60c is connected to the main power line 62. In this third state, if the voltage detected by the sensor 72c drops equal to or below a third predetermined threshold $t_3$, the controller 50 can be configured automatically switch the transfer switch 42 back to the first state. The controller 50 can then continue through this sequence of switching the transfer switch 42 as appropriate based on the detected voltages and their compliance with the predetermined thresholds $t_{1-3}$.

The predetermined thresholds $t_{1-3}$ described above can be identical to or different from each other. Moreover, one or more of the predetermined thresholds $t_{1-3}$ can be a fixed value (e.g., 110 V, 90 V, or 0 V), a fixed range of values (e.g., 110V or less), or a variable value or range of values that is predetermined based on one or more other electrical parameters of the system 10 (e.g., total power or current supplied at the outputs 30).

Furthermore, it is to be appreciated that the controller 50 may base its switching scheme on additional and/or alternative electrical parameters associated with the inputs 20. For example, if the transfer switch 42 is in the first state, the controller 50 may switch the transfer switch 42 to the second state if voltage detected by the sensor 72b at the second input line 60b rises equal to or above the second predetermined threshold $t_2$, regardless of whatever voltage is currently present at the first input line 60a. In other examples, the controller 50 may only switch the transfer switch 42 to the second state if the voltage detected by the sensor 72a drops equal to or below the first predetermined threshold $t_1$ and the voltage detected by the sensor 72b rises equal to or above the second predetermined threshold $t_2$.

Broadly speaking, the controller 50 can be configured to switch the transfer switch 42 from the first state to the second state in response to a switching condition being satisfied that requires any one or more of the following conditions: 1) a first electrical parameter (e.g., voltage) associated with the first input 20a is equal to or below a first predetermined threshold; 2) a second electrical parameter (e.g., voltage) associated with the second input 20b is equal to or above a second predetermined threshold; 3) the second electrical parameter is greater than the first electrical parameter; and/or 4) the second electrical parameter is greater than the first electrical parameter and a third parameter (e.g., voltage) associated with the third input 20c. By switching when the first electrical parameter associated with the first input 20a is equal to or below a first predetermined threshold, this can prevent a condition in which the transfer switch 42 is in the first state but the first input 20a cannot provide adequate power to the system 10. Any of these switching conditions can help prevent a situation where the power line 62 is connected to an input 20 that is providing insufficient power. Moreover, similar switching conditions may be required for switching the transfer switch 42 from the first state to the third state, the second state to the first state, the second state to the third state, the third state to the first state, or the third state to the second state.

Accordingly, the transfer switch 42 as operated by the controller 50 above can prevent a condition in which power supplied to the circuit assembly 40 is insufficient to support the total load requirements of the external devices 34, by automatically switching connection of the power line 62 1) from an input 20 providing insufficient power; and/or 2) to an input 20 that provides adequate power.

Nevertheless, there may be conditions if which all inputs 20 to the system 10 are providing insufficient power, in which case the switch operation above may not be helpful. Moreover, the system 10 may not include the transfer switch 42 in some embodiments, in which case alternative power inputs for the circuit assembly 40 may not even be available. Still further, even if full power is being supplied to the system 10, the total load requirements of the external devices 34 may exceed a maximum safe load for the system 10. Accordingly, the controller 50 can be separately configured to automatically perform a load shedding operation that sequentially opens the relays 80 of the AC lines 66a-e to prevent a condition in which a total load requirement for the system 10 is greater than what the system 10 can accommodate.

More specifically, the controller 50 can be in communication with each sensor 82 of the AC lines 66a-e. Each sensor 82 can be configured to detect an electrical parameter associated with its respective output 30 and provide an output signal to the controller 50 that corresponds to the detected parameter. For the purposes of this disclosure, an electrical parameter "associated" with an output 30 refers to an electrical parameter (e.g., voltage, current, etc.) at the output 30 itself or an electrical parameter at another portion of the system 10 that corresponds to or is dependent on an electrical parameter at the output 30. In the present embodiment, each sensor 82 is a solid-state current sensor configured to detect a current along its AC line 66, which will correspond to the current at its output 30. However, each sensor 82 may be configured to detect any other electrical parameter associated with its output 30. For instance, each sensor 82 can include a current sensor and voltage sensor for detecting power at its associated line 66 and sending an output signal to the controller 50 indicative of the power.

The controller 50 can be configured to continuously monitor the electrical parameters detected by the sensors 82 and determine a total of those electrical parameters (referred to hereinafter as a "total parameter P") If a load condition occurs in which multiple relays 80 are closed and the total parameter P is equal to or above a predetermined threshold $T_1$, the controller 50 can be configured to perform a load shedding operation that sequentially opens the relays 80 according to a predetermined opening scheme until the total parameter P is below the predetermined threshold $T_1$. The predetermined threshold $T_1$ can be a specific value corresponding to a maximum safe load for the system (e.g., 30 or 50 amps), or a range of values corresponding an unsafe load range for the system (e.g., any current greater than 50 amps). Moreover, the specific value or range of values can be fixed or variable based on one or more other electrical parameters of the system 10 (e.g., current, voltage, or power currently being supplied to the system 10).

The predetermined opening scheme prioritizes the relays 80 such that the relay 80e must be open before opening the 80d, the relay 80d must be open before opening the 80c, the relay 80c must be open before opening the 80b, and the relay 80b must be open before opening the 80a. Thus, if all relays 80a-e are closed and the total parameter P is equal to or above the predetermined threshold $T_1$, the controller 50 will open the relay 80e first, which will open the AC line 66e and thus stop the AC device 34e from drawing power from the circuit assembly 40. The sensors 82 will continue to detect their respective electrical parameters and the controller 50 will update the total parameter P accordingly. If the total parameter P is still equal to or above the predetermined threshold $T_1$, the controller 50 will then open the relay 80d, which will open the AC line 66d and thus stop the AC device 34d from drawing power from the circuit assembly 40. If the total parameter P is still equal to or above the predetermined threshold $T_1$, the controller 50 will continue sequentially opening the remaining relays 80 according to the predetermined opening scheme until the total parameter P is below the predetermined threshold $T_1$, at which point the controller 50 can cease opening any further relays 80.

It is to be appreciated that the order in which the relays 80 are prioritized can vary in different embodiments. For example, the controller 50 can be configured to prioritize opening of the relays 80 such that the relay 80a must be open before opening the 80b, the relay 80b must be open before opening the 80c, the relay 80c must be open before opening the 80d, and the relay 80d must be open before opening the 80e. Moreover, it is to be appreciated that if some relays 80 are already open, the load shedding operation can ignore those relays 80 and sequentially open the remaining relays 80 according to the predetermined opening scheme until the total parameter P is below the predetermined threshold $T_1$.

Still further, the number of relays 80 opened under the load shedding operation may vary by embodiment. For instance, the controller 50 may be configured to only open the first three relays 80a-c of the circuit assembly 40 sequentially. In some examples, the load shedding operation may include detecting electrical parameters associated with other outputs 30 (e.g., outputs 30f, 30f) and sequentially opening relays associated with those other outputs 30. Broadly speaking, the load shedding operation can be any operation that sequentially opens a plurality of relays based on a predetermined opening scheme.

As noted above, once the total parameter P drops below the predetermined threshold $T_1$, the controller 50 can cease opening any further relays 80. However, the controller 50 can be configured to continue updating the total parameter P and resume sequential opening of the relays 80 if the total parameter P later becomes equal to or greater than the predetermined threshold $T_1$.

In some examples, it may be possible to close relays 80 that were previously opened during the load shedding operation. For example, the loads of devices 34 connected to the closed relays 80 may drop and thus permit one or more opened relays 80 to be closed again without overloading the system 10. In other examples, the power supplied to the circuit assembly 40 may increase and thus be sufficient to accommodate more load.

Accordingly, the controller 50 in some examples may be configured to perform a load addition operation that similarly monitors the total parameter P and compares it with another predetermined threshold $T_2$ to determine if additional loads can be added to the system 10. The predetermined threshold $T_2$ is preferably less than the predetermined threshold $T_1$ and preferably corresponds to a maximum load or range of loads for the system 10 in which further loads can be added without substantial risk of overloading the system. The predetermined threshold $T_2$ can be fixed (e.g., 20 amps) or variable and predetermined based on one or more other electrical parameters of the system 10 (e.g., power currently being supplied to the system 10).

If a load condition occurs in which multiple relays 80 are open and the total parameter P is equal to or below the predetermined threshold $T_2$, the controller 50 can be configured to perform a load addition operation that sequentially closes the relays 80 according to a predetermined closing scheme until the total parameter P is above the predetermined threshold $T_2$. The predetermined closing scheme prioritizes the relays 80 opposite to the predetermined opening scheme, such that the relay 80a must be closed before closing the 80b, the relay 80b must be closed before closing the 80c, the relay 80c must be closed before closing the 80d, and the relay 80d must be closed before closing the 80e Thus, if the relays 80a-e are all open and the total parameter P is equal to or below the predetermined threshold $T_2$, the controller 50 will close the relay 80a, which will close the AC line 66a and thus enable the AC device 34a to draw power from the circuit assembly 40. The sensors 82 will continue to detect their respective electrical parameters and the controller 50 will update the total parameter P accordingly. If the total parameter P is still equal to or below the predetermined threshold $T_2$, the controller 50 will then close the relay 80b, which will close the AC line 66b and thus enable the AC device 34b to draw power from the circuit assembly 40. If the total parameter P is still equal to or below the predetermined threshold $T_2$, the controller 50 will continue sequentially closing the remaining relays 80 according to the predetermined closing scheme until the total parameter P is above the predetermined threshold $T_2$, at which point the controller 50 can cease closing any further relays 80.

It is to be appreciated that if some relays 80 are already closed, the load adding operation can ignore those relays 80 and sequentially close the remaining relays 80 according to the predetermined closing scheme until the total parameter P becomes equal to or above the predetermined threshold $T_2$.

Moreover, it is to be appreciated that the controller 50 can perform either of the load shedding and load adding operations as the total parameter P fluctuates relative to the predetermined thresholds $T_1$, $T_2$. That is, if the total parameter P becomes equal to or above the predetermined threshold $T_1$, the controller 50 can perform the load shedding operation until the total parameter P drops below the predetermined threshold $T_1$. Meanwhile, if the total parameter P drops equal to or below the predetermined threshold $T_2$, the controller 50 can perform the load adding operation until the total parameter P is above the predetermined threshold $T_2$. If the total parameter P is between the predetermined thresholds $T_1$, $T_2$, the controller 50 will maintain the relays 80 in their respective states. In this manner, the controller 50 can regulate load on the system 10 and prevent a condition in which a total load requirement for the system 10 is greater than what the circuit assembly 40 can accommodate.

In another example, the controller 50 can be configured to perform an alternative load adding operation that monitors electrical parameters associated with the relays 80 to determine if additional loads can be added to the system. For the purposes of this disclosure, an electrical parameter "associated" with a relay 80 refers to an electrical parameter (e.g., voltage, current, etc.) at the relay 80 itself or an electrical parameter at another portion of the system 10 that corresponds to or is dependent on an electrical parameter at the relay 80. For instance, each sensor 82 in the present embodiment is a current sensor configured to detect a current along its AC line 66, which will correspond to the current at its associated relay 80.

If a load shedding operation has previously been performed such that some of the relays 80 have been opened and some are still closed, the controller 50 can monitor the currents detected by the sensors 82 of the closed relays 80. If any of those currents drops equal to or below a predetermined threshold X, the controller 50 can close one of the opened relays 80 according to the predetermined closing scheme described above. The predetermined threshold X can be a fixed value (e.g., 0 or 5 amps), a fixed range of values (e.g., 0-5 amps), or a variable value or range of values that is predetermined based on one or more other electrical parameters of the system 10 (e.g., total power or current supplied to the system 10).

For example, if a load shedding operation had previously been performed such that the relays 80*c-e* are open but the relays 80*a* and 80*b* are still closed, the controller 50 can monitor the currents detected by the sensors 82*a*, 82*b*. If either of those currents is above the predetermined threshold X but subsequently drops to a value equal to or below the predetermined threshold X, the controller 50 will close the relay 80*c* since that relay has the highest priority of the open relays 80*c-e* according to the predetermined closing scheme described above. The controller 50 will now monitor the currents detected by the sensors 82*a-c* for the closed relays 80*a-c*. If any of those currents is above the predetermined threshold X but subsequently drops to a value equal to or below the predetermined threshold X, the controller 50 will close the relay 80*d* since that relay has the highest priority of the open relays 80*d*, 80*e* according to the predetermined closing scheme described above. The controller 50 will now monitor the currents detected by the sensors 82*a-d* for the closed relays 80*a-d*. If any of those currents is above the predetermined threshold X but subsequently drops to a value equal to or below the predetermined threshold X, the controller 50 will close the last open relay 80*e*.

As discussed above, the transfer switch 42 can be manually or automatically operated to alternately connect the inputs 20 to the circuit assembly 40. However, if the generator 24 is in an off state, it may be desirable to start the generator 24 and let it accumulate sufficient charge before connecting the input 20*b* for the generator 24 to the circuit assembly 40. Thus, the controller 50 can be operable to send a control signal to the generator 24 (via the signal line 70 and output 30*g*) that causes the generator 24 to start. For example, a user can operate the user interface 54 to send a command to the controller 50 that causes the controller 50 to in turn send a start signal to the generator 24.

In addition or alternatively, the controller 50 can be configured to automatically send the control signal to the generator 24 based on one or more electrical parameters of the system 10. For example, as discussed above, the controller 50 can be in communication with each sensor 72 of the input lines 60. Each sensor 72 is configured to detect a voltage associated with its respective input 20 and provide an output signal to the controller 50 that corresponds to the detected parameter. Thus, the controller 50 can monitor these voltages and compare them with predetermined thresholds to determine if a start signal should be sent to the generator 24.

For example, if the voltage detected by the sensor 72*b* for the generator 24 is zero and one or both of the voltages detected by the sensors 72*a*, 72*c* for shore power and solar panel assembly 26 are low, this could indicate a condition in which the generator 24 is off and should be turned on as a backup for the other power supplies. Even if one or both of the voltages detected by the sensors 72*a*, 72*c* for shore power and the solar panel assembly 26 are high, it still may be desirable to send a start signal to the generator 24 if it is off.

Therefore, the controller 50 can be configured to send a start signal to the generator 24 (via the signal line 70 and output 30*g*) in response to a control condition being satisfied that requires any one or more of the following conditions: 1) a first electrical parameter (e.g., voltage) associated with the first input 20*a* is equal to or below a predetermined threshold; 2) a second electrical parameter (e.g., voltage) associated with the second input 20*b* is zero; and/or 3) a third electrical parameter (e.g., voltage) associated with the third input 20*c* is equal to or below a predetermined threshold.

The predetermined thresholds for the first and third electrical parameters can be identical to or different from each other. Moreover, one or both of the predetermined thresholds can be a fixed value (e.g., 110 V, 90 V, or 0 V), a fixed range of values (e.g., 110V or less), or a variable value or range of values that is predetermined based on one or more other electrical parameters of the system 10 (e.g., total power or current supplied at the outputs 30). In some examples, the predetermined thresholds for the first and third electrical parameters can correspond to the predetermined thresholds $t_1$, $t_3$ described further above with respect to the automatic switching operation of the transfer switch 42.

As discussed above, the system 10 can include a user interface 54 with a display 56 and one or more input devices 58 (e.g., push-buttons, toggle switches, etc.). The user interface 54 can be configured to indicate one or more parameters of the system 10. For instance, the display 56 can display any of the electrical parameters, predetermined thresholds, total parameters, or predetermined closing or opening schemes discussed above. Moreover, the input devices 58 or the display itself 58 can be operated by a user to for adjusting one or more parameters of the system 10. For instance, the display 56 or input devices 58 can be operated to adjust predetermined thresholds or predetermined closing or opening schemes of the system 10.

As further discussed above, the circuit assembly 40 can be entirely contained within the interior compartment 18 of the housing 12, although it is to be appreciated certain portions of the assembly 40 may reside outside of the housing 12 in some examples. Moreover, the inputs 20, outputs 30, and user interface 54 can all be coupled to (e.g. fixed) to the housing 12 and electrically connected to its internal circuitry. In this manner, a single system 10 can be provided that can manage and distribute energy for external devices of a recreational vehicle.

Figure 2:
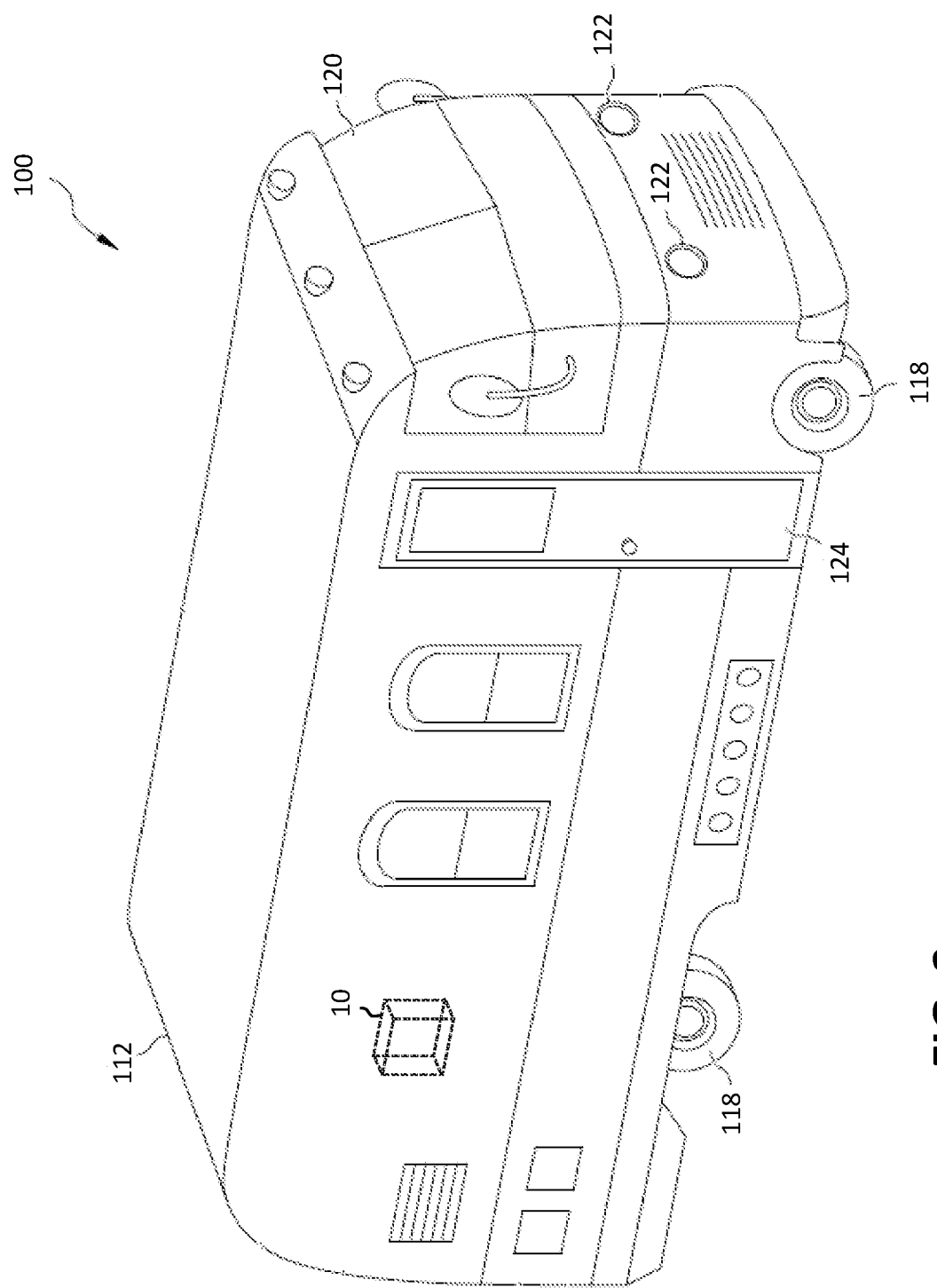
FIG. 2 is a perspective view of a recreational vehicle that includes the energy management system.

Turning to FIG. 2, one example recreational vehicle 100 is shown that includes a body 112, a plurality of wheels 118 supporting the body 112, a windshield 120 and headlights 122 provided at a front end of the body 112, and a door 124 for providing selective access to an interior of the body 112. The recreational vehicle 100 in the present example is a motorhome, meaning that it is a self-propelled recreational vehicle that offers mobile living accommodations within its interior (e.g., a kitchen, a bathroom, and one or more sleeping facilities). However, the recreational vehicle 100 can be other types of recreational vehicles in other embodiments such as, for example, an unpowered trailer.

As shown in FIG. 2, the energy management system 10 described above can be installed on an interior of the recreational vehicle 100 along a wall of its body 112. Once installed, one or more external power supplies can be connected to the inputs 20 of the system 10, and or more external devices can be connected to the outputs 30 of the system 10. In this manner, the system 10 can manage and distribute energy for the recreational vehicle 100.

Illustrative embodiments have been described, hereinabove. It will be apparent to those skilled in the art that the above apparatuses and methods may incorporate changes and modifications without departing from the scope of this disclosure. The invention is therefore not limited to particular details of this disclosure, and will encompass modifications and adaptions thereof within the spirit and the scope of the appended claims.

What is claimed is:

1. An energy management system for a recreational vehicle, the energy management system comprising:
a housing;
a plurality of outputs, each output having an associated electrical parameter; and
a circuit assembly arranged within the housing, the circuit assembly including:
a power converter configured to receive AC power, covert the AC power to DC power, and supply the DC power to one or more of the outputs,
a plurality of relays, each relay being associated with a corresponding output and operable between an open state and a closed state, and
a controller in communication with the plurality of relays, the controller being configured to configured to perform a load shedding operation in response to a first load condition being satisfied,
wherein the first load condition requires that a total parameter is equal to or above a first predetermined load threshold, the total parameter being a total value of the associated electrical parameters of the outputs,
wherein the load shedding operation sequentially opens any closed relays of the plurality of relays according to a predetermined opening scheme until the total parameter is below the first predetermined load threshold,
wherein the plurality of relays includes a first relay, a second relay, and a third relay, and
wherein the predetermined opening scheme requires the third relay to be open before opening the second relay, and requires the second relay to be open before opening the first relay.

2. An energy management system for a recreational vehicle, the energy management system comprising:
a housing;
a plurality of outputs, each output having an associated electrical parameter; and
a circuit assembly arranged within the housing, the circuit assembly including:
a power converter configured to receive AC power, covert the AC power to DC power, and supply the DC power to one or more of the outputs,
a plurality of relays, each relay being associated with a corresponding output and operable between an open state and a closed state, and
a controller in communication with the plurality of relays, the controller being configured to configured to perform a load shedding operation in response to a first load condition being satisfied, and a load adding operation in response to a second load condition being satisfied,
wherein the first load condition requires that a total parameter is equal to or above a first predetermined load threshold, the total parameter being a total value of the associated electrical parameters of the outputs,
wherein the second load condition requires that the total parameter is equal to or below a second predetermined load threshold,
wherein the load shedding operation sequentially opens any closed relays of the plurality of relays according to a predetermined opening scheme until the total parameter is below the first predetermined load threshold, and
wherein the load adding operation sequentially closes any open relays of the plurality of relays according to a predetermined closing scheme until the total parameter is above the second predetermined load threshold.

3. The energy management system according to claim 2, wherein:
the plurality of relays includes a first relay, a second relay, and a third relay, and the predetermined closing scheme requires the first relay to be closed before closing the second relay, and requires the second relay to be closed before closing the third relay.

4. The energy management system according to claim 2, wherein the second predetermined load threshold is less than the first predetermined load threshold.

5. An energy management system for a recreational vehicle, the energy management system comprising:
a housing;
a plurality of outputs, each output having an associated electrical parameter; and
a circuit assembly arranged within the housing, the circuit assembly including:
a power converter configured to receive AC power, covert the AC power to DC power, and supply the DC power to one or more of the outputs,
a plurality of relays, each relay being associated with a corresponding output and operable between an open state and a closed state, and
a controller in communication with the plurality of relays, the controller being configured to configured to perform a load shedding operation in response to a first load condition being satisfied, and a load adding operation in response to a second load condition being satisfied, wherein the first load condition requires that a total parameter is equal to or above a first predetermined load threshold, the total parameter being a total value of the associated electrical parameters of the outputs, wherein the second load condition requires that an electrical parameter associated with a closed relay drops equal to or below a second predetermined load threshold, wherein the load shedding operation sequentially opens any closed relays of the plurality of relays according to a predetermined opening scheme until the total parameter is below the first predetermined load threshold, and wherein the load adding operation closes an open relay according to a predetermined closing scheme.

6. The energy management system according to claim 5, wherein:

the plurality of relays includes a first relay, a second relay, and a third relay, and the predetermined closing scheme requires the first relay to be closed before closing the second relay, and requires the second relay to be closed before closing the third relay.

7. The energy management system according to claim 1, wherein the energy management system includes a first input and a second input, and the circuit assembly includes:

a transfer switch, a first input line connecting the first input to the transfer switch, a second input line connecting the second input to the transfer switch, and a power line connected to the transfer switch, wherein the transfer switch is selectively operable between a first state that connects the first input line to the power line, and a second state that connects the second input line to the power line.

8. The energy management system according to claim 7, wherein the controller is configured to automatically switch the transfer switch between the first state and second state based on one or more electrical parameters, each electrical parameter being associated with one of the first and second inputs.

9. An energy management system for a recreational vehicle, the energy management system comprising:

a housing;

a first input, the first input having a first electrical parameter associated with the first input a second input, the second input having a second electrical parameter associated with the second input a plurality of outputs, each output having an associated electrical parameter; and a circuit assembly arranged within the housing, the circuit assembly including:

a transfer switch, a first input line connecting the first input to the transfer switch, a second input line connecting the second input to the transfer switch, and a power line connected to the transfer switch, a power converter configured to receive AC power, covert the AC power to DC power, and supply the DC power to one or more of the outputs, a plurality of relays, each relay being associated with a corresponding output and operable between an open state and a closed state, and a controller in communication with the plurality of relays, the controller being configured to configured to perform a load shedding operation in response to a first load condition being satisfied, wherein the first load condition requires that a total parameter is equal to or above a first predetermined load threshold, the total parameter being a total value of the associated electrical parameters of the outputs, wherein the load shedding operation sequentially opens any closed relays of the plurality of relays according to a predetermined opening scheme until the total parameter is below the first predetermined load threshold, wherein the transfer switch is selectively operable between a first state that connects the first input line to the power line, and a second state that connects the second input line to the power line, wherein the controller is configured to automatically switch the transfer switch between the first state and second state based on one or both of the first and second electrical parameters, wherein the controller is configured to automatically switch the transfer switch from the first state to the second state in response to a switching condition being satisfied, wherein the switching condition requires that:

the first electrical parameter associated with the first input equal to or below a first predetermined switching threshold, the second electrical parameter associated with the second input is equal to or above a second predetermined switching threshold, or the second electrical parameter is greater than the first electrical parameter.

10. The energy management system according to claim 9, wherein the switching condition requires that the first electrical parameter associated with the first input is equal to or below the first predetermined switching threshold.

11. The energy management system according to claim 9, wherein the switching condition requires that the second electrical parameter associated with the second input is equal to or above the second predetermined switching threshold.

12. The energy management system according to claim 9, wherein the switching condition requires that the second electrical parameter associated with the second input is greater than the first electrical parameter associated with the first input.

13. The energy management system according to claim 9, wherein the switching condition requires that:

the first electrical parameter associated with the first input is equal to or below the first predetermined switching threshold, the second electrical parameter associated with the second input is equal to or above the second predetermined switching threshold, and the second electrical parameter is greater than the first electrical parameter.

14. The energy management system according to claim 9, wherein:

the energy management system includes a third input, the circuit assembly includes a third input line connecting the third input to the transfer switch, the transfer switch is selectively operable between the first state, the second state, and a third state that connects the third input line to the power line, and the switching condition requires that the second electrical parameter associated with the second input is greater than the first electrical parameter associated with the first input and a third electrical parameter associated with the third input.

15. An energy management system for a recreational vehicle, the energy management system comprising:

a housing;

a first input;

a plurality of outputs, each output having an associated electrical parameter; and a circuit assembly arranged within the housing, the circuit assembly including:
- a power converter configured to receive AC power, covert the AC power to DC power, and supply the DC power to one or more of the outputs,
- a plurality of relays, each relay being associated with a corresponding output and operable between an open state and a closed state, and
- a controller in communication with the plurality of relays, the controller being configured to configured to perform a load shedding operation in response to a first load condition being satisfied, wherein the first load condition requires that a total parameter is equal to or above a first predetermined load threshold, the total parameter being a total value of the associated electrical parameters of the outputs, wherein the load shedding operation sequentially opens any closed relays of the plurality of relays according to a predetermined opening scheme until the total parameter is below the first predetermined load threshold, wherein the plurality of outputs includes a control output, and wherein the controller is configured to send a control signal to the control output based on a first electrical parameter associated with the first input.

16. The energy management system according to claim 15, wherein the controller is configured to send a control signal to the control output in response to a control condition being satisfied, wherein the control condition requires that the first electrical parameter associated with the first input is equal to or below a predetermined control threshold.

17. The energy management system according to claim 16, wherein:
- the energy management system includes a second input, and
- the control condition requires that a second electrical parameter associated with the second input is zero.

18. The energy management system according to claim 17, wherein:
- the circuit assembly includes a transfer switch, a first input line connecting the first input to the transfer switch, a second input line connecting the second input to the transfer switch, and a power line connected to the transfer switch,
- the transfer switch is selectively operable between a first state that connects the first input line to the power line, and a second state that connects the second input line to the power line, and
- the controller is configured to automatically switch the transfer switch from the first state to the second state in response to a switching condition being satisfied, wherein the switching condition requires that the second electrical parameter associated with the second input is equal to or above a predetermined switching threshold.

19. A recreational vehicle comprising:

a body;

a plurality of wheels supporting the body;

a door for providing selective access to an interior of the body; and the energy management system according to claim 1, wherein the energy management system is provided within the interior of the body.

* * * * *